United States Patent [19]
Kilker et al.

[11] Patent Number: 5,924,324
[45] Date of Patent: Jul. 20, 1999

[54] MOVABLE GEAR DRIVE WINDSHIELD WIPER

[75] Inventors: Daniel D. Kilker, Freeport, Ill.; Scott Morris, Livonia, Mich.

[73] Assignee: UT Automotive Dearborn, Inc., Dearborn, Mich.

[21] Appl. No.: 08/947,979

[22] Filed: Oct. 9, 1997

[51] Int. Cl.$^6$ .............................. F16H 27/02; G05G 9/00; A47L 1/00
[52] U.S. Cl. ...................... 74/89.18; 74/471 R; 15/250.3
[58] Field of Search ............................... 74/29, 30, 89.18, 74/471 R, 459, 424.8 NA, 665 F, 665.6; 15/250.12, 250.13, 250.16, 250.3; 292/252

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,615,945 | 10/1952 | Jaeschke . |
| 2,659,237 | 11/1953 | Wood . |
| 2,722,617 | 11/1955 | Cluwen et al. . |

(List continued on next page.)

FOREIGN PATENT DOCUMENTS

| | | |
|---|---|---|
| 0 345 002 A2 | 6/1989 | European Pat. Off. . |
| 1281424 | 12/1961 | France . |
| 822 178 | 11/1951 | Germany . |
| 28 16 207 A1 | 10/1979 | Germany . |
| 3807087 A1 | 9/1989 | Germany . |

(List continued on next page.)

OTHER PUBLICATIONS

Patent Abstracts of Japan, vol. 016, 7–438 (M–1309), Sep. 1992 for JP Patent Publication No. 04151351.
P. 100, *Machine Design*, 60 (1988) Oct. 13, No. 24, Cleveland, Ohio, US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, Article "Mechanical Systems".
A paper from the Third Conference on Mechanisms, "A Survey of Intermittent–Motion", F.J. Bogardus, 1956, pp. 8–15.

(List continued on next page.)

*Primary Examiner*—John A. Jeffery
*Assistant Examiner*—Brandon C. Stallman
*Attorney, Agent, or Firm*—Harness, Dickey & Pierce, P.L.C.

[57] ABSTRACT

In accordance with the present invention, the preferred embodiment of a movable gear drive windshield wiper apparatus employs an axial motion mechanism and a bidirectional driving mechanism. Rotation of a rotatable member in a first direction causes a transverse movement of the rotatable member along a ball screw shaft of the axial motion mechanism to a first position where it rotates in a given plane. Rotation of the rotatable member in the opposite direction causes the rotatable member to move down the ball screw shaft to a second position where it rotates in a second given plane. In another aspect of the present invention, the bi-directional driving mechanism rotationally drives a driven member such that the driven member is oscillated by continuously rotating the rotatable member in the first direction. In a further aspect of the present invention, the rotatable member selectively actuates a plurality of discrete motion mechanisms thereby causing a plurality of mechanical devices coupled thereto to operate.

10 Claims, 5 Drawing Sheets

U.S. PATENT DOCUMENTS

| | | |
|---|---|---|
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,701,972 | 10/1987 | Saito . |
| 4,702,117 | 10/1987 | Tsutsumi et al. . |
| 4,724,760 | 2/1988 | Bubley . |
| 4,733,147 | 3/1988 | Muller et al. . |
| 4,793,640 | 12/1988 | Stewart, Sr. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,622,082 | 4/1997 | Machelski ...................... 74/424.8 R X |
| 5,691,586 | 11/1997 | Yonnet et al. . |
| 5,694,812 | 12/1997 | Maue et al. . |
| 5,730,028 | 3/1998 | Maue et al. . |
| 5,844,382 | 12/1998 | Dan . |

FOREIGN PATENT DOCUMENTS

| | | |
|---|---|---|
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 6/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb. 1996, H. Winston Maue, pp. 73–76.

MOVABLE GEAR DRIVE WINDSHIELD WIPER

BACKGROUND OF THE INVENTION

The present invention relates generally to movable gear drives and specifically to a movable gear drive capable of operating a plurality of separate actuators in conjunction with a windshield wiper drive assembly in an automotive vehicle.

Almost all automotive vehicles have a single or a pair of windshield wiper assemblies. These assemblies traditionally include rubber wiper blades mounted upon claw brackets. These claw brackets are attached to wiper arms mounted upon rotating shafts. These shafts are either directly driven by electric motors or driven by a single electric motor which actuates series or parallel-coupled four-bar linkage mechanisms.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft mounted worm gear enmeshed therewith. This type of rear window wiper arrangement is usually mounted upon a pivoting liftgate or tailgate of a mini van, station wagon, sport-utility vehicle or the like. Examples of conventional window wiper assemblies and motor mechanisms are disclosed within the following U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider et al. on Sep. 26, 1972; and U.S. Pat. No. 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release latch, actuated by a solenoid, which can be unlatched to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. The liftgate lock is traditionally operated by manual key or handle rotation, or through a separate electric motor or solenoid.

Additionally, separate motors and solenoids are required to actuate passenger door locks, antenna retraction mechanisms, headlamp cover retraction mechanisms, fuel filler door locks and other similar functions. The traditional need for such a multiplicity of electromagnetic devices has increased the automotive vehicle weight and cost while further proving difficult to package within the often small spaces provided. This added weight is specially detrimental when the window wiper mechanism, rear window latch and liftgate lock, as well as their distinct respective electromagnetic devices, are all incorporated within the pivoting liftgate. Not only is the piece cost increased due to this multiplicity of electromagnetic devices, but the assembly cost, part number proliferation and handling cost, electrical wiring cost, objectional motor noise, and failure modes are increased.

SUMMARY OF THE INVENTION

In accordance with the present invention, the preferred embodiment of a movable gear drive windshield wiper apparatus employs an axial motion mechanism and a bidirectional driving mechanism. Rotation of a rotatable member in a first direction causes transverse movement of the rotatable member along a ball screw shaft of the axial motion mechanism to a first position where it rotates in a given plane. Rotation of the rotatable member in the opposite direction causes the rotatable member to move down the ball screw shaft to a second position where it rotates in a second given plane. In another aspect of the present invention, a bidirectional driving mechanism rotationally drives a driven member such that the driven member is oscillated by continuously rotating the rotatable member in the first direction. In a further aspect of the present invention, the rotatable member selectively actuates a plurality of discrete motion mechanisms thereby causing a plurality of mechanical devices coupled thereto to operate.

The movable gear drive windshield wiper apparatus of the present invention is advantageous over conventional systems since the present invention combines many different functions into a single apparatus. For example, the present invention replaces the traditional separate rear wiper motor, liftgate lock motor and rear window lock solenoid. Accordingly, the present invention significantly reduces the piece costs, assembly costs, part proliferation and handling costs, wiring costs, and battery current consumption as compared to conventional constructions. Furthermore, the present invention significantly reduces weight and packaging space requirements while increasing the electrical and mechanical reliability of the affected systems. Objectional motor and solenoid noises are also reduced. Moreover, the present invention provides a means for oscillating a windshield wiper through unidirectional motor operation. Additional advantages and features of the present invention will become apparent from the following description and appending claims, taken in conjunction with the accompanying drawings.

DETAILED DESCRIPTION OF THE PREFERRED EMBODIMENTS

Figure 1:
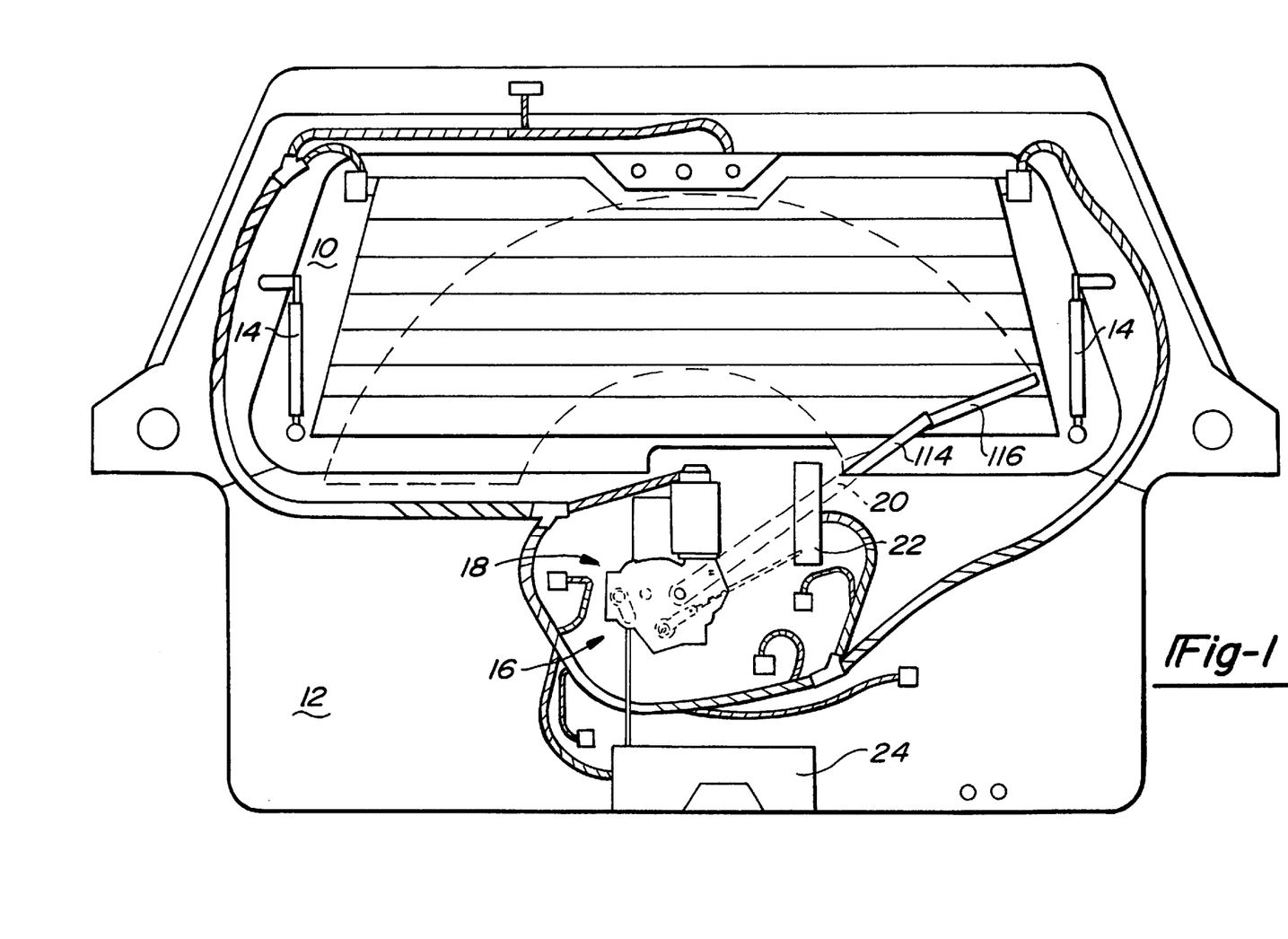
FIG. 1 is a front elevational view showing the preferred embodiment of a movable gear drive windshield wiper apparatus of the present invention.

An automotive vehicle, such as a sport utility vehicle, station wagon, minivan or the like, has a rear tailgate door which can pivot about a lower pair of hinges coupled to the vehicle body structure. This type of automotive vehicle also has a rear window or backlite which can pivot about an upper pair of hinges coupled to the vehicle body structure. When the tailgate and rear window are pivoted to an open position, a cargo space is accessible from behind the vehicle. Such a tailgate and rear window are shown in FIG. 1. Rear window 10 is pivotable between a closed position, substantially flush with the outer surface of tailgate 12, to an open position about upper hinges. A pair of pneumatic cylinders 14 act to push window 10 toward the open position when a lower portion of window 10 is released. The preferred embodiment of a movable gear drive windshield wiper apparatus 16 of the present invention is mounted upon an inner surface of tailgate 12. The majority of movable gear drive 16 is hidden by an interior trim panel (not shown). Movable gear drive 16 includes a central drive and power transmission unit 18, a window wiper assembly 20, a window release latch 22 and a tailgate lock 24, all of which are mounted upon tailgate 12. Examples of such locks (employing separate solenoids or motors, which would be removed in order to couple the lock mechanism for use with the present invention) are disclosed within the following U.S. Pat. No. 5,222,775 entitled "Power Operated Latch Device for Automotive Back Door" which issued to Kato on Jun. 29, 1993; U.S. Pat. No. 4,422,522 entitled "Inertial Lock for Vehicle Door Latch" which issued to Slavin et al. on Dec. 27, 1983; and U.S. Pat. No. 3,917,330 entitled "Electric Lock Release" which issued to Quantz on Nov. 4, 1975; all of which are incorporated by reference herewithin.

Figure 2:
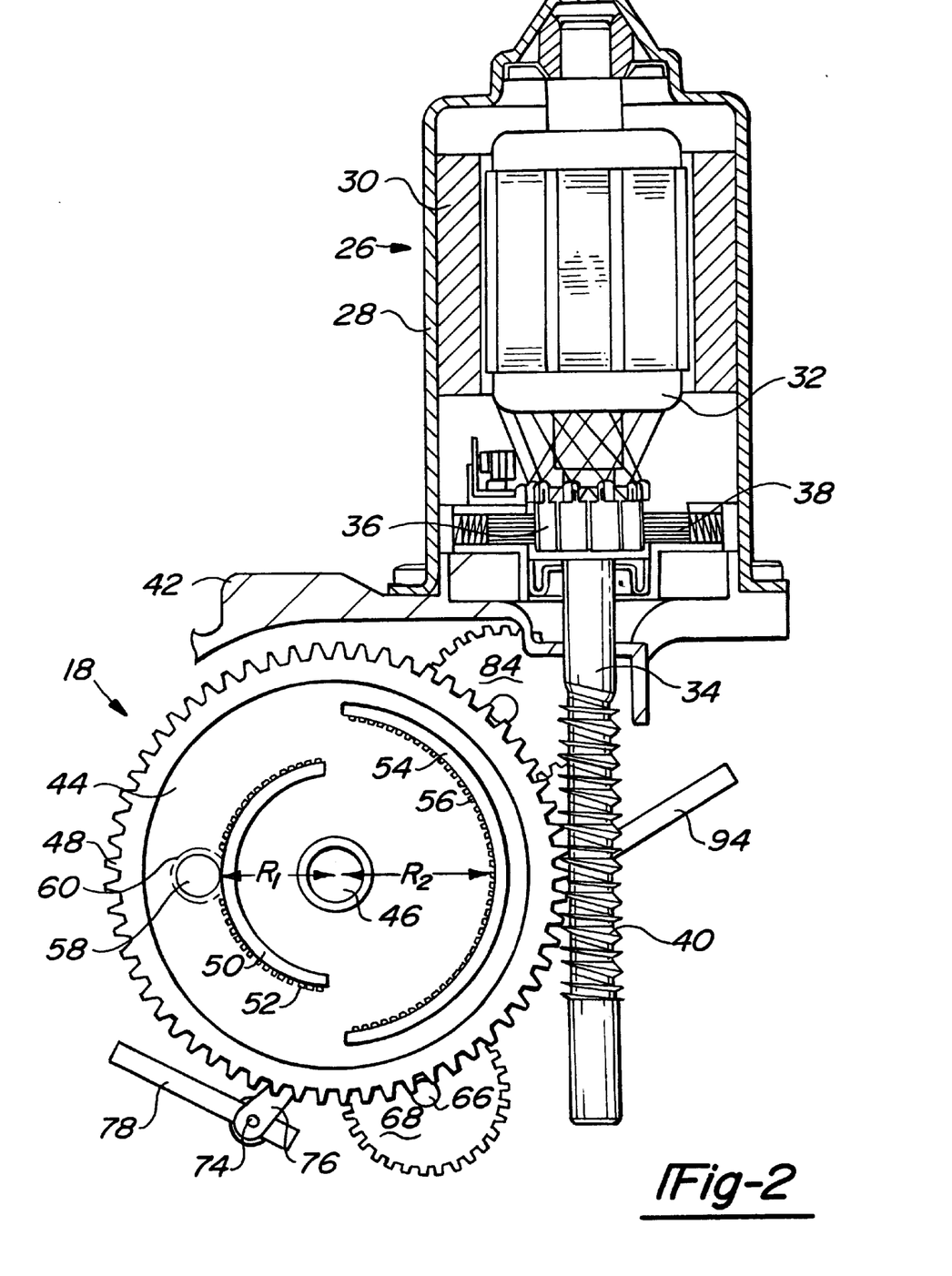
FIG. 2 is a rear elevational view, with portions broken away therefrom, showing the preferred embodiment movable gear drive windshield wiper apparatus of the present invention.
Figure 3:
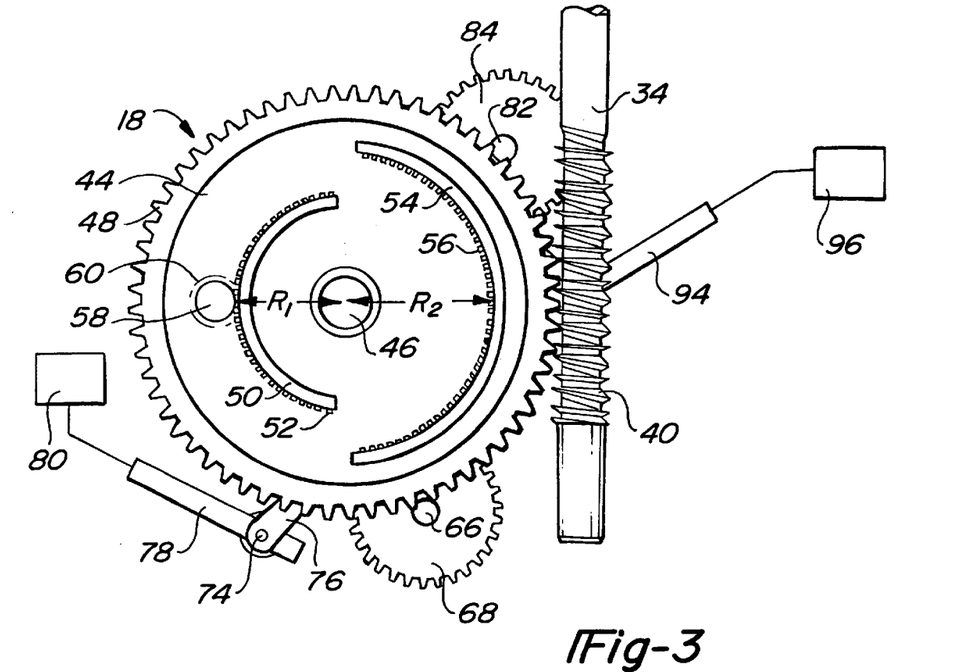
FIG. 3 is a diagrammatic rear elevational view showing the preferred embodiment movable gear drive windshield wiper apparatus of the present invention.

The construction of central drive and power transmission unit 18 is best illustrated in FIGS. 2 and 3. An electric motor 26 is of a conventional 12 volt fractional horsepower, dc electromagnetic variety having a metallic motor housing 28 within which are stationary permanent magnets 30, a rotatable armature 32 with wire windings, a rotatable armature shaft 34 joined to armature 32, a commutator 36 electrically connected to the wire windings and rotatable with armature shaft 34, a brush card assembly 38 and various electronic components, bushings and retainers. It will be appreciated to those skilled in the art that other electric motor constructions can readily be substituted for that shown. A worm gear segment 40 is provided upon a portion of armature shaft 34 extending beyond motor housing 28.

A gear housing 42 is also provided for receiving worm gear segment 40 and the immediately adjacent portions of armature shaft 34. A main helical gear 44 is also housed and rotatably journaled within gear housing 42. Gear housing 42 is preferrably made from cast aluminum. A ball screw shaft 46, to be described in greater detail below, is press fit or otherwise attached within a machined opening of gear housing 42.

Helical gear 44 has an external set of helically oriented teeth 48 projecting entirely thereround for enmeshing with worm gear segment 40. A first sector gear 50 is mounted upon a face of helical gear 44 for rotating therewith. First sector gear 50 has a partially circular peripheral surface and includes a radius of curvature measured from a center point of the ball screw shaft 46 to the pitch diameter equal to R1. First sector gear 50 has an outside diameter set of teeth 52 projecting therefrom. A second sector gear 54 is also mounted upon a face of helical gear 44 for rotating therewith. Second sector gear 54 has a partially circular peripheral surface and a radius of curvature measured from the ball screw shaft 46 to the pitch diameter equal to R2. Second sector gear 54 has an inside diameter set of teeth 56 projecting therefrom. First sector gear 50 and second sector gear 54 are coaxially aligned in opposing spaced relation about ball screw shaft 46. A wiper shaft 58 is supported in variable spaced relation (due to the axial motion mechanism described below) to the face of helical gear 44. Wiper shaft 58 has a set of teeth 60 projecting entirely thereround for enmeshing with outside diameter teeth 52 of first sector gear 50 and inside diameter teeth 56 of second sector gear 54. Wiper shaft 58 is supported for rotation about its own longitudinal access in a conventional manner and has a diameter corresponding to the difference between R2 and R1.

Figure 4:
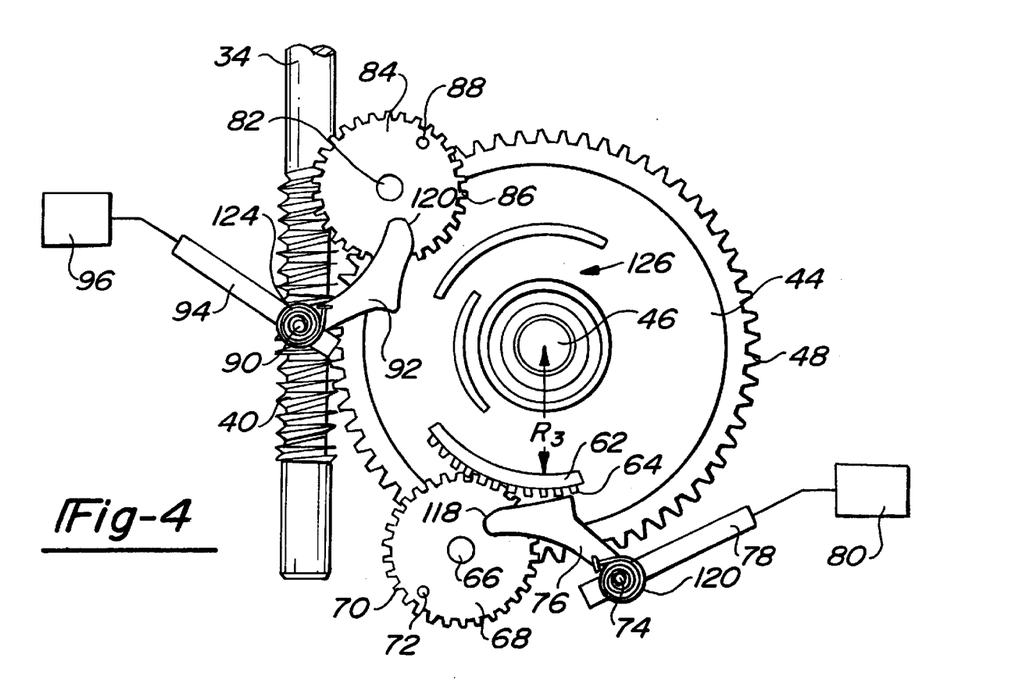
FIG. 4 is a diagrammatic front elevational view showing the preferred embodiment movable gear drive windshield wiper apparatus of the present invention.

The opposite face of helical gear 44 is illustrated in FIG. 4. A third sector gear 62 is mounted upon the opposite face of helical gear 44 for rotating therewith. Third sector gear 62 has a partially circular peripheral surface and a radius of curvature measured from the ball screw shaft 46 equal to R3. Third sector gear 62 has an outside diameter set of teeth 64 projecting therefrom. A knurled steel journaling pin 66 is press fit or otherwise attached within machined openings of gear housing 42 (see FIG. 2). Pin 66 can alternately be molded as part of plastic gears and cams. A spur gear 68 is coaxially aligned for rotation about journaling pin 66. Spur gear 68 has a set of teeth 70 projecting entirely thereround for enmeshing with outside diameter teeth 64 of third sector gear 62. A drive pin 72 projects from a face of spur gear 68 substantially parallel to the adjacent journaling pin 66. Drive pin 72 has a cylindrical driving interface surface thereabout. Of course, a rotatable sleeve may alternately surround drive pin 72. Other alternate driving interface means may be employed such as an integrally molded finger, screw, rivet, spring, rib, plural projections or other similar formations protruding from a face of peripheral portion of spur gear 68. A second knurled steel journaling pin 74 is press fit or otherwise attached within another machined opening of gear housing 42 (see FIG. 1). A cam 76 is rotatably supported for rotation about journaling pin 74 and overlies helical gear 44 and spur gear 68. An extension lever 78 is fixedly coupled or integrally formed with cam 76 adjacent journaling pin 74. Extension lever 78 is operatively coupled by conventional means (cables, links, levers, etc.) to actuator 80 for actuating a mechanical device such as rear window release latch 22 (see FIG. 1). One skilled in the art will appreciate that the reference herein to rear window release latch 22 is merely exemplary and any number of similar systems found in an automotive vehicle could substitute therefor such as passenger door locks, an antenna retraction mechanism, headlamp cover retraction mechanism, a fuel filler door lock, or a hood latch mechanism among others.

A third knurled steel journaling pin 82 is press fit or otherwise attached within another machined opening of gear housing 42 (see FIG. 2). A second spur gear 84 is coaxially aligned for rotation about journaling pin 82. Second spur gear 84 has an external set of teeth 86 projecting entirely thereround for enmeshing with outside diameter teeth 64 of third sector gear 62. A second drive pin 88 projects from a face of second spur gear 84 substantially parallel to the adjacent journaling pin 82. Drive pin 88 has a cylindrical driving interface surface thereabout. Again, a rotatable sleeve may alternately surround drive pin 88 and other alternate driving interface means may be employed therein. A fourth knurled steel journaling pin 90 in press fit or otherwise attached within another machined opening of gear housing 42 (see FIG. 2). A second cam 92 is rotatably mounted for rotation about journaling pin 90. Cam 92 overlies helical gear 44 and second spur gear 84. An extension lever 94 is coupled to or formed integrally with cam 92 adjacent journaling pin 90. Extension lever 94 is operably coupled by conventional means to an actuator 96 for actuating a mechanical device such as tailgate lock/unlock mechanism 24. Again, tailgate lock/unlock mechanism 24 is merely exemplary of any number of alternate mechanisms which may substitute therefor.

Figure 5:
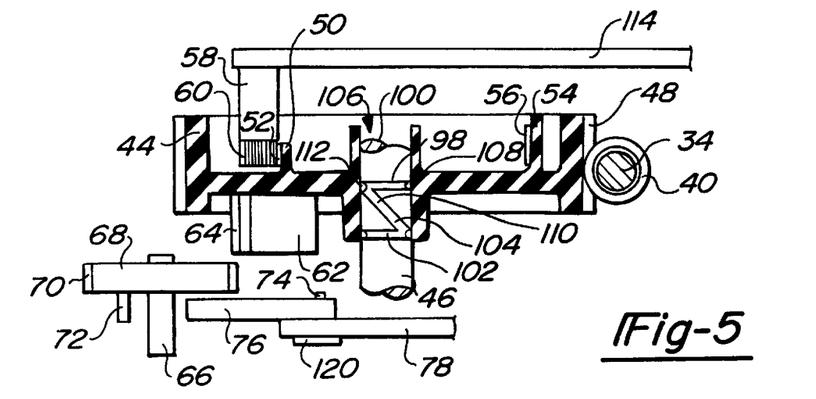
FIG. 5 is a partial cross-sectional view showing the axial motion mechanism of the preferred embodiment movable gear drive windshield wiper apparatus of the present invention in a wipe position.
Figure 6:
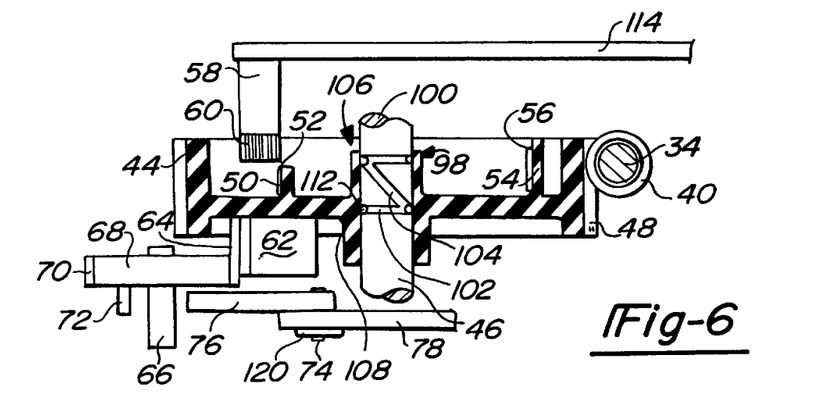
FIG. 6 is a partial cross-sectional view showing the axial motion mechanism of the preferred embodiment movable gear drive windshield wiper apparatus of the present invention in a park position.

Referring now to FIGS. 5 and 6, the ball screw shaft 46 will now be described in greater detail. Ball screw shaft 46 forms the basis of an axial motion mechanism for moving helical gear 44 between a wipe plane and an actuator plane. In addition to the ball screw shaft 46, axial motion mechanism includes a first circular slot 98 formed about a perimeter of ball screw shaft 46 adjacent distal end 100. Ball screw shaft 46 also includes a second circular slot 102 formed about a perimeter thereof in axially spaced relation to the first circular slot 98. First circular slot 98 and second circular slot 102 are interconnected by a helical slot 104 helically oriented about a perimeter of ball screw shaft 46. A surface of helical gear 44 adjacent axial bore 106 define a circular slot 108 complimentary of circular slots 98 and 102 of the ball screw shaft 46. When assembled, the plurality of slots 98, 102, and 104 formed in ball screw shaft 46 and slot 108 of helical gear 44 define a passageway 110 encasing a plurality of ball bearings 112 which move therealong depending upon the rotational direction of helical gear 44. As such, ball screw shaft 46 supports helical gear 44 for relative rotary movement thereabout through journaled engagement of ball bearings 112 with passageway 110.

The operation of the movable gear drive windshield wiper apparatus of the present invention can best be understood by referring to FIGS. 3–6. In FIG. 3, armature 34 is rotated by motor 26 in a first direction. Meshing engagement of worm gear segment 40 of armature 34 with helically arranged teeth 48 of helical gear 44 causes the rotation of armature 34 to be transferred to helical gear 44. As such, helical gear 44 rotates in a clockwise direction (as illustrated in FIG. 3) about ball screw shaft 46. First sector gear 50 and second sector gear 54 rotate with helical gear 44 as it is driven by armature 34. As best viewed in FIG. 4, clockwise rotation of helical gear 44 causes helical gear 44 to rotate generally about slot 98 in a first rotary plane referred to hereinafter as the wipe plane. In the wipe plane, balls 112 nest within the passageway 110 defined by slot 98 of ball screw shaft 46 and slot 108 of helical gear 44. As such, helical gear 44 is maintained in the wipe position.

While helical gear 44 is rotated in the wipe position plane, the teeth 60 of wiper shaft 58 intermittently meshingly engage outside diameter teeth 52 of first sector gear 50 and inside diameter teeth 56 of second sector gear 54. Wiper shaft 58 remains engaged with first sector gear 50 for approximately 175° of rotation of helical gear 44. This causes wiper shaft 58 to rotate about its own longitudinal axis in a first direction (counterclockwise in FIG. 3). Accordingly, a wiper 114 fixed (i.e., splined) to wiper shaft 58 moves through a first sweep of rear window 10 (see FIG. 1) and a wiper blade 116 wipes the rear window 10 in a first direction.

When the helical gear 44 rotates beyond the approximately 175° consumed by first sector gear 50, the teeth 60 of wiper shaft 58 disengage from the outside diameter teeth 52 of first sector gear 50. After a momentary pause, the teeth 60 of wiper shaft 58 meshingly engage with inside diameter teeth 56 of second sector gear 54. Continued rotation of helical gear 44 in the clockwise direction causes the second sector gear 54 to drive the wiper shaft 58 about its own longitudinal axis in a second direction (clockwise in FIG. 3), which is opposite the first direction caused by engagement with first sector gear 50. Preferably, second sector gear 54 consumes approximately 180° of the rotation of helical gear 44. Accordingly, wiper 114 reverse sweeps across rear window 10 (see FIG. 1). The small gap (approximately 5°) between first sector gear 50 and second sector gear 54 enables wiper shaft 58 to transition from rotation in a first direction (counterclockwise) to rotation in a second direction (clockwise). This "dwell time" also pauses the wiper blade 116 at the end of each sweep of rear window 10. Advantageously, the cooperation of first sector gear 50, second sector gear 54 and wiper shaft 58 enables motor 26 (see FIG. 2) to run in the same direction during an entire windshield wiping function.

When motor 26 is run in an opposite direction from the windshield wiping function direction, armature 34 rotates helical gear 44 in an opposite direction (counterclockwise in FIG. 3) than in the wipe mode via engagement of worm gear segment 40 with teeth 48. As best seen in FIGS. 5 and 6, rotation of helical gear 44 in this direction causes ball bearings 112 to impinge upon the portion of the ball screw shaft 46 adjacent the intersection of circular slot 102 and helical slot 104. Since this portion of the ball screw 46 is sharply angled, any interference of the ball bearings 112 therewith causes the ball bearings 112 to deflect into the helical slot 104. Since the ball bearings 112 must continuously reside in slot 108 as they migrate through helical slot 104 towards second circular slot 102, helical gear 44 is driven axially away from circulation slot 98 by engagement of ball bearings 112 with surfaces of helical gear 44 adjacent slot 108. As such helical gear 44 moves axially along ball screw shaft 46 away from wiper shaft 58. Continued rotation in this direction causes balls 112 to nest within passageway 110 defined between circular slots 102 and 108. Helical gear 44 is thereafter maintained for rotation in a second plane referred to hereinafter as the actuator plane. Axial movement of helical gear 44 along ball screw shaft 46 brings third sector gear 62 into the same plane as the spur gears 68 and 84. As such, continued controlled rotation of helical gear 44 selectively causes outside diameter teeth 64 of third sector gear 62 to meshingly engage with teeth 70 of spur gear 68. Further rotation causes teeth 64 to meshingly engage with teeth 86 of spur gear 84. The twist of helical slot 104 controls the angular position of third sector gear 62 relative to spur gear 68 and 84 when helical gear 44 arrives at the actuator plane. Preferably, this angular position is approximately 90° counterclockwise from spur gear 68 in FIG. 4 and is reached when the movable gear drive windshield wiper apparatus of the present invention is in the park position referred to above.

Rotation of helical gear 44 approximately 90° from the park position causes outside diameter teeth 64 of third sector gear 62 to meshingly engage with teeth 70 of spur gear 68. Continued rotation of helical gear 44 causes third sector gear 62 to drive spur gear 68 about its journaling pin 66. As illustrated in FIG. 4, when driven, spur gear 68 rotates in a clockwise direction. The radial dimension of third sector gear 62 determines the amount of rotation of spur gear 68. Preferably, spur gear 68 is rotated in such a manner that pin 72 abuttingly engages cam 76 at camming surface 118. The engagement of pin 72 with camming surface 118 forces cam 76 radially away from helical gear 44 relative to ball screw shaft 46. Cam 76 and extension lever 78 pivot about journaling pin 74 thereby actuating actuator 80. Preferably, actuator 80 thereby unlatches rear window 10 from tailgate 12 (see FIG. 1). Reverse rotation of helical gear 44 disengages pin 72 from camming surface 118 and cam 76 and extension lever 78 are returned to their original position under the bias of coil spring 120.

However, continued rotation of helical gear 44 in the clockwise direction shown in FIG. 4 causes third sector gear 62 to disengage from spur gear 68 and rotate towards second spur gear 84. Further rotation of helical gear 44 causes outside diameter teeth 64 of third sector gear 62 to meshingly engage with teeth 86 of spur gear 84 thereby causing spur gear 84 to rotate in a clockwise direction as illustrated in FIG. 4. Controlled rotation of spur gear 84 causes pin 88 to abuttingly engage camming surface 122 of cam 92. If rotation of helical gear 44 is continued, pin 88 is forced against camming surface 122 such that cam 92 and extension lever 94 are pivoted about journaling pin 90 and actuate actuator 96. Preferably, actuator 96 serves to lock and unlock tailgate 12 from the vehicle body (see FIG. 1). Further rotation of helical gear 44 causes outside diameter teeth 64 of third sector gear 62 to disengage from teeth 86 of spur gear 84. Thereafter, cam 92 and extension lever 94 are returned to their original position under the bias of coil spring 124.

The controlled rotation of helical gear 44 to rotate one or both of spur gears 68 and 84 is controlled through an electrically conductive feedback disk generally shown at 126 in FIG. 4 retained on the back face of helical gear 44 through ultrasonically rolled welding or insert molding. Feedback disk 126 is comprised of a set of copper alloy or brass alloy stamped contacts which are provided with differing conductive and nonconductive patterns depending on the specific positional ranges desired. A microprocessor (not shown) or a control unit (also not shown) electrically communicate the conductive pattern on feedback disk 126 for sensing the rotational position of helical gear 44 and motor 26. A more detailed discussion of feedback disk 126 and its functionality in conjunction with an electronic control unit may be found in U.S. Ser. No. 08/430,388 entitled "Multi-Functional Apparatus Employing an Intermittent Motion Mechanism" filed Apr. 28, 1995, in the name of Zimmer et al. which is incorporated by reference herewithin.

Figure 7:
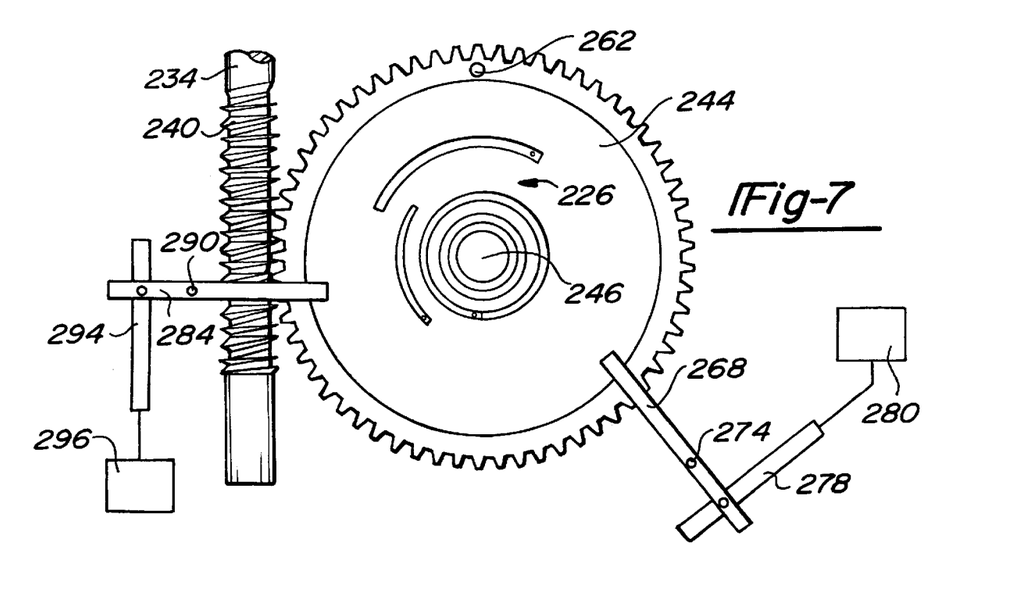
FIG. 7 is a diagrammatic rear view showing an alternate embodiment movable gear drive windshield wiper apparatus of the present invention.
Figure 8:
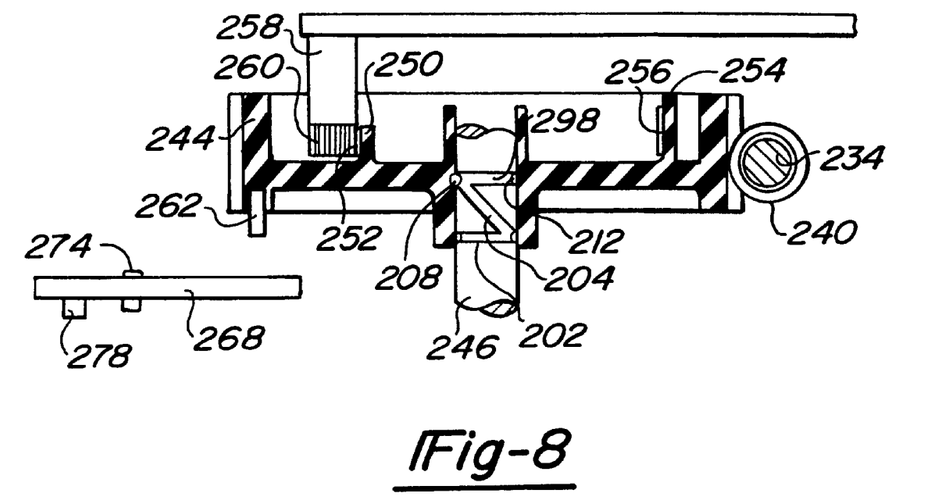
FIG. 8 is a partial sectional view showing the axial motion mechanism of the alternate embodiment movable gear drive windshield wiper apparatus of the present invention in a wipe position.
Figure 9:
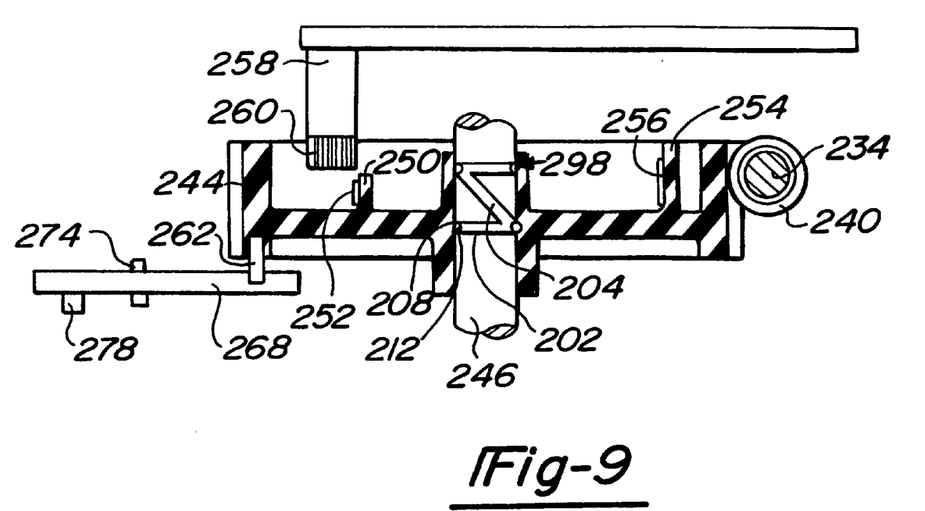
FIG. 9 is a partial sectional view showing the axial motion mechanism of the alternate embodiment movable gear drive windshield wiper apparatus of the present invention in a park position.

An alternate embodiment of the movable gear drive windshield wiper apparatus of the present invention is illustrated in FIGS. 7–9. In this embodiment, a worm gear segment 240 of an armature shaft 234 drives a helical gear 244 enmeshed therewith via motor 26 (see FIG. 2). A drive pin 262 projects from the back face of helical gear 244 substantially parallel to the adjacent ball screw shaft 246. As with the first embodiment, a rotatable sleeve may alternately surround drive pin 262 or other alternate driving interface means may be employed therein. An electrically conductive feedback disk 226 is also retained on the rear face of helical gear 244 and comprises a set of copper alloy or brass alloy stamped contacts which are provided with differing conductive and nonconductive patterns depending on the specific positional ranges desired as described above with reference to the first embodiment. A first knurled steel journaling pin 274 is press fit or otherwise attached within a machined opening of gear housing 42 (see FIG. 2). A first lever arm 268 is journally supported for rotation about journaling pin 274. An extension lever 278 is fixably coupled or formed integrally with first lever arm 268. Extension lever 278 is operably coupled by conventional means (cables, links, levers, etc.) to actuator 280 for actuating a release mechanism such as rear window release latch 22 (see FIG. 1).

A second knurled steel journaling pin 290 is press fit or otherwise attached within another machined opening of gear housing 42 (see FIG. 2). A second lever arm 284 is journally supported for rotation about journaling pin 290. An extension lever 294 is fixably coupled or formed integrally with second lever arm 284. Extension lever 294 is operably coupled with actuator 296 such as liftgate lock/unlock mechanism 24 (see FIG. 1).

The operation of the alternate embodiment movable gear drive windshield wiper apparatus of the present invention is substantially similar to that of the first embodiment and will be described hereinafter with reference to FIGS. 7–9. As helical gear 244 is rotated in a first direction, it is maintained in a wipe plane by the axial motion mechanism of the present invention. Additionally, the first sector gear 250 and second sector gear 254 cooperate to intermittently drive wiper shaft 258 through meshing engagement of outside diameter teeth 252 and inside diameter teeth 256 with wiper shaft teeth 260. Upon rotation in an opposite direction, helical gear 244 axially transcends ball screw shaft 246 as dictated by the interaction of ball bearings 212, with slots 298, 202, 204, and slot 208. Upon reaching the actuator plane, continued rotation of helical gear 244 selectively abuts drive pin 262 with first lever arm 268 thereby pivoting lever arm 268 and extension lever 278 about journaling pin 274 so as to actuate actuator 280. Further rotation of helical gear 244 abuttingly engages drive pin 262 with second lever arm 284 thereby pivoting second lever arm 284 and extension lever 294 about journaling pin 290 so as to operate actuator 296. Lever arms 268 and 284 and extension levers 278 and 294 are returned to their original position by the bias of springs or other means. Reversing motor 26 causes helical gear 244 to rotate in an opposite direction and axially moves helical gear 244 along ball screw shaft 246 to the wipe plane.

While various embodiments of this movable gear drive windshield wiper apparatus have been disclosed, it will be appreciated that various modifications may be made without departing from the present invention. For example, a solenoid, electromagnet or other electromagnetic devices may be used in place of the previously described electric motor. Furthermore, additional spur gears, pinion gears, sector gears, planetary gears, jack screws, sprockets and chains, pulleys and belts, cables or other force transmitting means may be employed to couple between the motor, helical gear, linkage, or actuators. Moreover, a multiple gear transmission, linkage, belt or cable system can alternately couple a wiper assembly to the wiper shaft. It will further be appreciated that a variety of other multiplexed or non-multiplexed, microprocessor or analog circuitry may used to control the apparatus of the present invention. The operation of the actuators may be also be accomplished by leveraged linking means rather than the fixed linkage means illustrated. The movable gear drive windshield wiper apparatus of the present invention can further be employed for front windshield wipers, headlight wipers or other automotive vehicle and non-automotive vehicle applications. Moreover, the present invention can operate a backlite wiper in a hatchback or fixed backlite sedan. While various materials, electronic components, and force transmitting members have been disclosed, a variety of other such materials, electronic components and force transmitting devices may be used. It is intended by the following claims to cover these and any other departures from the disclosed embodiments which fall within the true spirit of this invention.

What is claimed is:

1. A movable gear drive apparatus comprising:

an axial motion mechanism;

a rotatable member coupled to said axial motion mechanism for selective movement from a first rotary plane to a second rotary plane;

an electromagnetic device coupled to said rotatable member for selectively rotating said rotatable member;

at least one driving interface surface on said rotatable member;

a link having a driven interface surface thereof engageable with said at least one driving interface surface;

at least two sector gears concentrically located in spaced relation on said rotatable member; and external teeth of said at least two sector gears enmeshing with external teeth of a member for providing oscillating movement to said member.

2. The gear drive apparatus of claim 1 wherein said axial motion mechanism is further defined as a ball screw device including:

a ball screw shaft passing through an axial bore of said rotatable member such that said rotatable member is rotatably supported thereon; and at least one ball bearing disposed in a passageway defined between said ball screw shaft and a surface of said rotatable member adjacent said axial bore.

3. The gear drive apparatus of claim 2 wherein:

said passageway is further defined as a first circular channel and a second circular channel interconnected by a helical channel; and said ball bearing is moveable between said first circular channel and said second circular channel along said helical channel for moving and maintaining said rotatable member among said first rotary plane and said second rotary plane.

4. The gear drive apparatus of claim 1 wherein:

said rotatable member is further defined as a main gear with a set of external gear teeth; and said electromagnetic device is further defined as a single, fractional horsepower, electric motor operable to rotate an armature shaft having a worm gear segment, said worm gear segment enmeshing with said gear teeth of said main gear.

5. The gear drive apparatus of claim 1 wherein:

said at least one driving interface surface on said rotatable member is further defined as a drive pin; and said link is further defined as a lever arm selectively moveable between a first position and a second position upon engagement with said drive pin for selectively operating an actuator coupled thereto.

6. The gear drive apparatus of claim 1 wherein:

said at least one driving interface surface on said rotatable member is further defined as external teeth of a third sector gear; and said link is further defined as a spur gear selectively moveable between a first position and a second position upon engagement with said third sector gear for selectively operating an actuator coupled thereto.

7. The gear drive apparatus of claim 1 wherein:

said at least two sector gears are further defined as a first sector gear having a first radius and a second sector gear having a second radius, said second radius being greater than said first radius by an amount corresponding to a dimension of said member; and said external teeth of said at least two sector gears are further defined as a set of outside diameter teeth extending from said first sector gear and a set of inside diameter teeth extending from said second sector gear.

8. The gear drive apparatus of claim 7 wherein:

said first sector gear and said second sector gear are disposed in opposing relation so as to define a nearly circular driving interface surface; and said nearly circular driving interface surface including a non-driving region defining a driving direction transition area.

9. A moveable gear drive apparatus comprising:

a rotatable member;

an electromagnetic device selectively rotating said rotatable member; and at least two sector gears concentrically located in spaced relation on said rotatable member, said at least two sector gears including external teeth enmeshing with external teeth of a member for providing oscillating movement to said member.

10. The gear drive apparatus of claim 9 wherein:

said at least two sector gears are further defined as a first sector gear having a first radius and a second sector gear having a second radius, said second radius being greater than said first radius by an amount corresponding to a dimension of said member; and said external teeth of said at least two sector gears are further defined as a set of outside diameter teeth extending from said first sector gear and a set of inside diameter teeth extending from said second sector gear.

* * * * *